(12) United States Patent
Cordner et al.

(10) Patent No.: US 6,665,660 B1
(45) Date of Patent: Dec. 16, 2003

(54) SYSTEM FOR RETRIEVING MIGRATORY DATA ITEMS, USING URLS

(75) Inventors: Michael R. Cordner, Kitchener (CA); Richard Hildred, Waterloo (CA)

(73) Assignee: NCR Corporation, Dayton, OH (US)

( * ) Notice: Subject to any disclaimer, the term of this patent is extended or adjusted under 35 U.S.C. 154(b) by 308 days.

(21) Appl. No.: 09/628,203

(22) Filed: Jul. 28, 2000

(51) Int. Cl.⁷ .............................................. G06F 17/30
(52) U.S. Cl. ............................... 707/3; 707/10; 705/35
(58) Field of Search ..................... 709/217; 707/103 R, 707/3, 4; 382/140; 283/58; 235/375; 705/35

(56) References Cited

U.S. PATENT DOCUMENTS 5,602,936 A * 2/1997 Green et al. ................ 382/140
5,659,729 A * 8/1997 Nielsen ........................ 707/3
5,804,803 A * 9/1998 Cragun et al. .............. 235/375

* cited by examiner

Primary Examiner—Kim Vu
Assistant Examiner—Gwen Liang
(74) Attorney, Agent, or Firm—Gregory A. Welta

(57) ABSTRACT

A system for retrieving cancelled bank checks. The storage locations of cancelled bank checks tend to change over the lifetimes of the checks. The invention transmits a search query which identifies checks of interest, to the computer servers handling the stored checks. The servers locate the checks, if present, which match the query. The query is transmitted to the servers as part of a URL, Uniform Resource Locator, which is an Internet address.

15 Claims, 4 Drawing Sheets

SYSTEM FOR RETRIEVING MIGRATORY DATA ITEMS, USING URLS

The invention concerns retrieving data items which move, or migrate, from one storage location to another, and particularly non-text data items such as bitmaps. The invention utilizes URLs to locate the data items, using the Internet.

BACKGROUND OF THE INVENTION

A specific problem arises in locating cancelled bank checks. For example, some customers do not receive cancelled checks with their monthly statements. Instead, the cancelled checks are placed into storage. If a customer wishes to obtain one of the cancelled checks, the customer orders the check to be retrieved from storage. It will be located, and either the check itself, or a copy, will be given to the customer.

However, a single storage location will probably not be involved. The physical cancelled check will probably migrate to different locations during its lifetime. For example, at the time of issuance of the monthly statement on which the check appears, the check will probably be stored in a temporary file near the location of the system which issues the monthly statements. One reason for the nearby storage is that, if an accounting mistake is found, it may be necessary to examine the check, to ascertain that its amount was correctly entered in the customer's account.

After the statements are issued, however, the check will be moved to a more permanent storage location. Further, after a substantial time has expired, such as five years, the check may be moved to a more remote storage location, since the likelihood that a customer will call for such an old check is small.

Therefore, in these examples, cancelled bank checks will generally be moved through different storage locations throughout their lives. If access is to be maintained to the checks, these storage locations must somehow be tracked.

A similar situation occurs when the cancelled checks are returned to the customer with the monthly statements. In this situation, the banks retain copies of the checks. In the past, the copies were made on microfilm. Today, digitized computer copies are feasible. But, in either case (microfilm or digital), the copies still must be stored in a physical location, and the location will probably change over time. The locations must be tracked, if the copies are to be made available to interested parties.

In addition, even if a given bank stores all cancelled checks at a single location (which is considered unlikely), events can occur which introduce storage at multiple locations. For example, if two such banks merge with each other, then the two single storage locations will probably be consolidated into a single storage location. Thus, one of the storage locations will change.

Therefore, the storage locations of cancelled bank checks change over time. If the checks are to be made available, some agency must track the changes.

OBJECTS OF THE INVENTION

An object of the invention is to provide an improved system for storage of cancelled bank checks.

A further object of the invention is to provide a system for storage of cancelled bank checks, which accommodates movement of checks to different storage locations.

SUMMARY OF THE INVENTION

In one form of the invention, a search query in pursuit of a cancelled check is transmitted to a server handling the check, in the form of a suffix added to a URL which identifies the server.

BRIEF DESCRIPTION OF THE DRAWINGS

FIG. 3 also illustrates a server SS which contains no collection of bank checks, which receives a query from a man M. Server SS locates one or more collections of records relevant to the query, and directs the query to the server(s) associated with the collection(s).

DETAILED DESCRIPTION OF THE INVENTION

Figure 1:
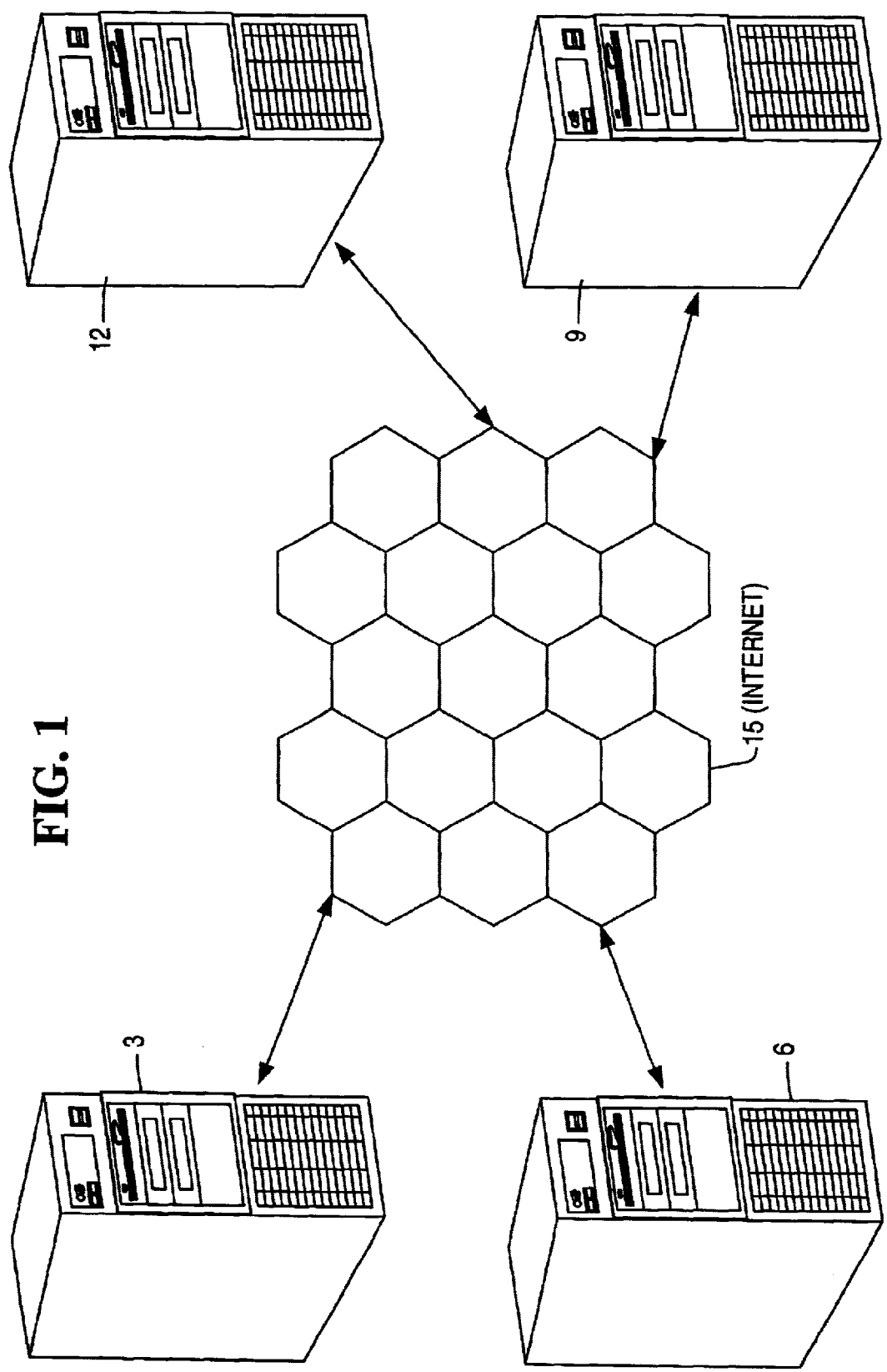
FIG. 1 illustrates four servers connected by the Internet 15.

FIG. 1 illustrates a collection of computer servers 3, 6, 9, and 12, connected to the Internet, or World Wide Web, indicated as network 15. Each server is operated by a financial institution (not shown) which produces cancelled checks, which must be stored. Alternately, multiple servers may be involved, operated by cooperating financial institutions.

The cancelled checks are stored (1) as originals, in the form of cancelled paper checks, or (2) as copies. The copies can be stored in at least two ways: (1) in tangible, human-readable format, such as on paper or photographic film, or (2) as digitized bitmaps, or computer files, which are stored in a tangible medium, such as a disc drive or tape, but are not directly human-readable.

Figure 2:
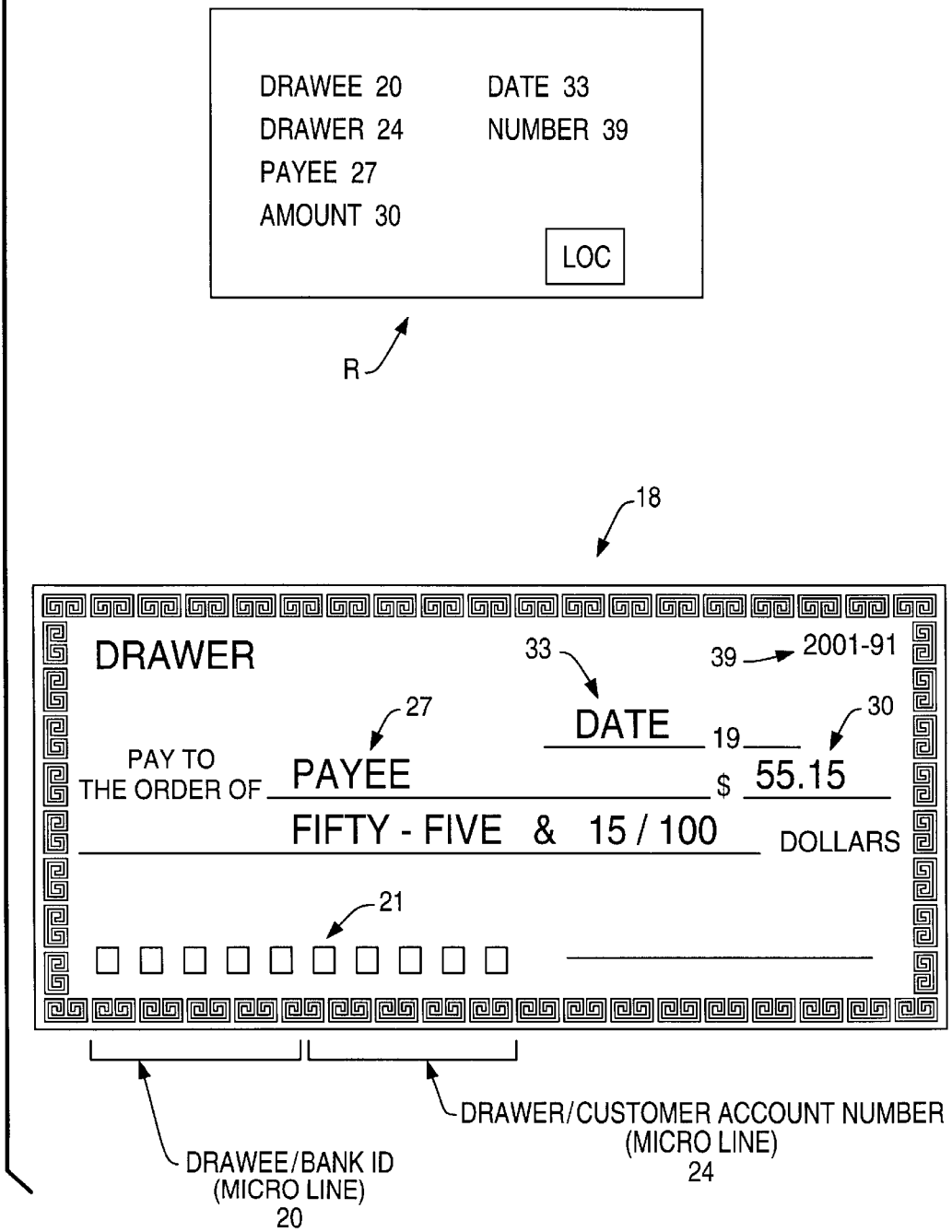
FIG. 2 illustrates a bank check 18, and a record R containing selected data from the check.

FIG. 2 illustrates a representative check 18. When each check is stored, a record R containing individual fields of the check is generated. The record R shown contains the following fields: (1) the identity of the drawee-bank upon which the check was drawn, as indicated by the bank's identity number 20 taken from the micro-line 21; (2) the identify of the drawer of the check, as indicated by the customer's account number 24, taken from the micro-line 21; (3) the name of the payee 27, (4) the amount 30 of the check, (5) the date 33 of the check, and (6) the number 39 of the check.

The record R can be made manually, as when a human reader reads each check, and enters the data read into the corresponding field in the record R. Alternately, computerized character reading systems exist which generate the records automatically. Some of these systems generate a bitmap of some, or all, of the check 18, and perform character recognition on the bitmap.

Figure 3:
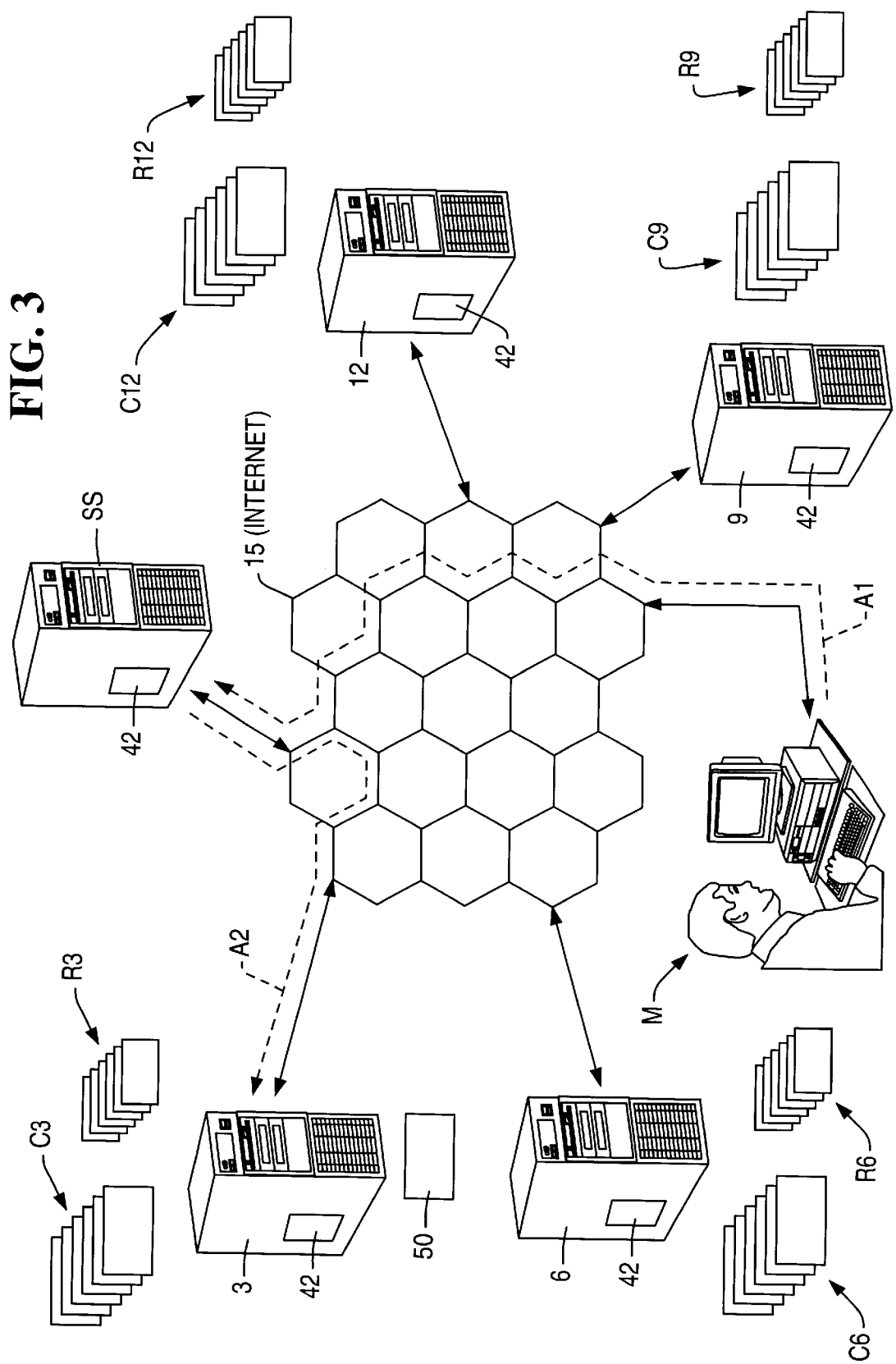
FIG. 3 illustrates (1) the servers of FIG. 1, (2) for each server, a collection of cancelled bank checks in storage, such as C3 for server 3, and (3) a collection of records, such as R3, each record corresponding to a check in the collection C3.

Each server 3, 6, 9, and 12 in FIG. 3 will contain a collection of cancelled checks C3, C6, C9, and C12. Each server will also contain a collection of records R3, R6, R9, and R12. As time passes, the checks and records will move to other storage locations, which will be controlled by other servers. Also, as explained below, even if the checks and records are located at the physical site of a server, such as server 3, in practice, another computer will probably handle the management of the checks and records. Block 50 in FIG. 3, associated with server 3, represents these other computers. While such other computers will be associated with the other servers in FIG. 3, a single block 50 is used to represent them all, to avoid clutter.

Under the arrangement just described, each server in FIG. 3 contains a database. The contents of the database are the records R of the checks. If a user wishes to locate a specific check, the user runs a query on the database. Database management software 42, known in the art, runs a search wherein the records R are examined, and the results of the query returned.

The database management software 42 is indicated as running on the servers shown. In practice, it may be preferable for the other computer systems, discussed above and indicated by block 50 located adjacent server 3, to handle the database management. The system 50 stores the database, and runs the database management software 42 for server 3. Other systems of similar type do the same for the other servers 6, 9, and 12. In practice, the different servers will utilize different types of database management software 42, although the software systems 42 need not be different, but can be identical.

As an example of a query, a user may wish to locate all checks having the following characteristics:

(1) an amount exceeding $100.00, (2) a specific drawer, that is, being drawn on a specific customer account number, (3) a specific drawee, that is, drawn on a specific bank, and (4) payable to "Electric Company."

The management software 42 will locate all checks (if any) meeting these conditions, within the database handled by the management software 42.

The connection to the server indicated in FIG. 3 allows parties to remotely perform queries on the databases, by delivering queries to selected servers, and thus selected instances of management software 42, over the Internet. For example, man M may issue a query, which takes the path indicated by arrow A1 to server SS. Server SS identifies the set, or sets, of records most relevant to the query, and directs the query to the server(s) maintaining the set(s) of records.

In addition, the system is designed so that the queries follow a specific syntax, which is integrated into a URL, Uniform Resource Locator. The server utilizes the contents of the query to identify a database to which to direct the query, and directs the query accordingly. As explained below, the server may direct the query to additional databases.

The URL will first be explained.

A generalized server which is connected to the Internet is assigned a URL, which acts as the address of the server. Hypothetical, but realistic, URLs for servers 3, 6, 9, and 12 in FIG. 3 could be

BANK_SERVER_3.COM,

BANK_SERVER_6.COM,

BANK_SERVER_9.COM, and

BANK_SERVER_12.COM, respectively.

If a party wishes to transmit a generalized data packet, apart from the present invention, to one of these servers over the Internet, the party inserts the URL at the proper location in a header of the packet, and transmits the header/packet combination to a node on the Internet. Commonly, the delivery to a node is accomplished by delivering the packet to an Internet Service Provider, ISP, which acts as a node.

The node reads the URL, passes it to an appropriate other node which repeats the process, and the passing-off continues, until the packet reaches the server identified by the URL in the header.

In effect, the URL within the packet acts as the address of the recipient-server, and the nodes of the Internet act as the postal service which deliver the packet to the recipient-server.

Under the invention, if a user wishes to locate a check, the user appends a specific search query, as a suffix, to the URL of the server believed to possess the record R of the check. The query follows a specific syntax, which will now be explained.

As discussed above, the record R in FIG. 2 contains six fields. These can be identified by abbreviated labels, as indicated in Table 1:

TABLE 1

| Item in Check/<br>Field in Record<br>(FIG. 2) | Abbreviated<br>Label |
| --- | --- |
| Drawee bank 20 | De |
| Drawer 24 | Dr |
| Payee 27 | P |
| Amount 30 | A |
| Date 33 | Da |
| Number 39 | N |

Given these abbreviations, a query can be framed as follows:

De = First National, Chicago;

Dr = Max Jacobs;

P = Grant Wilcox;

A = 42.00;

D = 03/03/99;

N = ?.

This query requests all records in which (1) the drawee, De, is First National of Chicago, (2) the drawer, Dr, is Max Jacobs, (3) the payee, P, is Grant Wilcox, (4) the amount, A, is $42.00, (5) the date, Da, is March 3, 1999, and (6) the check number, N, is a wild card, or any number.

This query was simplified, for ease of explanation. In practice, the drawee will be identified by the drawee bank's identity code. Similarly, the drawer will be identified by the drawer's account number. Consequently, the actual query will be, for example, De = 066-884;

Dr = 40203;

P = Grant Wilcox;

A = 42.00;

Da = 03/03/99;

N = ?.

This query is appended to the URL of a server expected to hold the records which will return a result of the query. As an example, the final query may be BANK_SERVER_3.COM/De = 066-884; Dr = 40203; P = Grant Wilcox; A = 42.00; Da = 03/03/99; N =?.

Given these abbreviations, a query can be framed as follows:

De=First National, Chicago;

Dr=Max Jacobs;

P=Grant Wilcox;

A=42.00;

Da=03/03/99;

N=?.

This query requests all records in which (1) the drawee, De, is First National of Chicago, (2) the drawer, Dr, is Max Jacobs, (3) the payee, P, is Grant Wilcox, (4) the amount, A, is $42.00, (5) the date, Da, is Mar. 3, 1999, and (6) the check number, N, is a wild card, or any number.

This query is appended to the URL of a server expected to hold the records which will return a result of the query. As an example, the final query may be BANK_SERVER_3.COM/De=066-884; Dr=40203; P=Grant Wilcox; A=42.00; Da=03/03/99; N=?.

If man M in FIG. 3 is making the query, this query is delivered to an Internet node, or ISP, indicated by the dot labeled ISP, which causes the entire URL/query to be routed to BANK_SERVER_3.COM.

When BANK_SERVER_3.COM receives the URL/query, the query is extracted from the URL, and the query is processed, by management software 42 in FIG. 3. The query can be processed by BANK_SERVER_3.COM, but, as explained above, in practice, it is expected that the query will be processed by an associated system, represented by block 50.

The results of the query will identify the records containing fields which match the query. Each record R in FIG. 2 contains a field, labeled LOC, which indicates the current storage location of its check 18. The records identified will thus identify the storage locations of the corresponding checks.

In one form of the invention, the records identified, including the identification of the locations LOC, are transmitted to the party who submitted the query. In practice, the results of the query will be packaged into a message, which is addressed to that party, and transmitted to the ISP.

In another form of the invention, the actual bitmap, or other digital graphic image, of the checks matching the query will be retrieved from storage, and transmitted to the party submitting the query. That is, if the check is stored as a bitmap, a copy of the bitmap is transmitted to the submitter. If the check is stored in human-readable form, as on microfilm, a bitmap is generated, and transmitted to the submitter.

Figure 4:
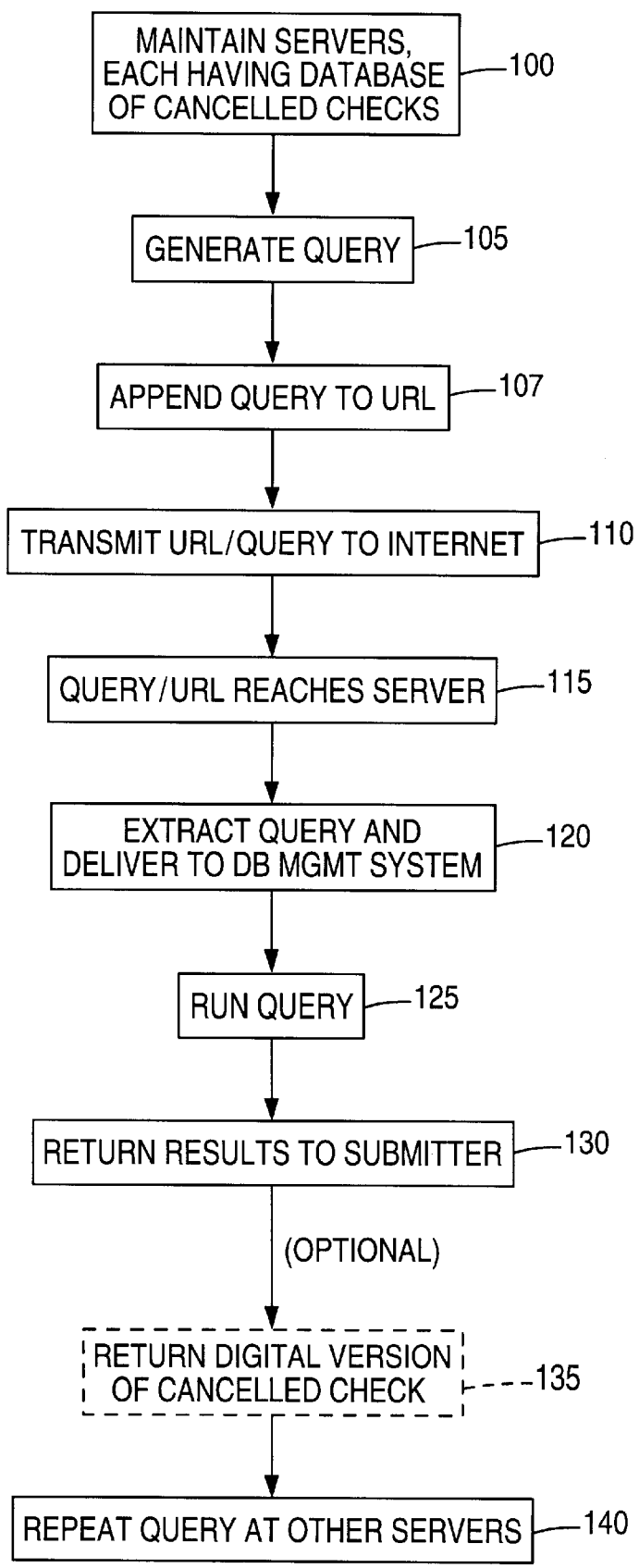
FIG. 4 is a flow chart of steps undertaken by one form of the invention.

FIG. 4 is a flow chart of steps undertaken by one form of the invention. Block 100 indicates that Internet-connected servers are maintained, having a database of records, each record corresponding to a cancelled bank check.

It is observed that the records R in FIG. 3 are used for convenience in searching. The records R collectively form an "index," as that term is used in database parlance. But the records R are not strictly required for the search: the stored checks themselves can be searched, which requires storing each check in a digital, computer-searchable format.

Block 105 in FIG. 4 indicates that a query is generated by the submitter. Block 107 indicates that the query is appended to the URL of the server to whom the query is directed. Block 10 indicates that the query/URL combination is transmitted to the Internet, for delivery to the targeted server.

Block 115 indicates that the query/URL combination reaches the targeted server. Block 120 indicates that, after reaching the targeted server, the query is extracted from the query/URL combination, and delivered to database management system.

Block 125 indicates that the database management software runs the query. Block 130 indicates that the results of the query are returned to the submitter of the query, as by a return message to the node at which the submitter submitted the query, or an electronic mail message.

Optional block 135 indicates that a digital version of the cancelled check is returned along with the query results. For example, a field may be added to the query, which indicates whether the submitter requests actual copies of any checks located by the query. In the example given above, a term such as Ret=Y, meaning "Return, Yes," may be added to the query, perhaps after the term "N=?". This term will cause the server running the query to locate the digital versions of the cancelled checks which answer the query, and return them to the submitter of the query. If this term is absent, or stated as Ret=N, meaning "Return, No," then no digital versions are returned.

Block 140 indicates that the query is repeated for other servers known to store records of cancelled checks. This may occur if a prior query, of another server, returned no results. This may also occur if a prior query did return results, but evidence exists that other checks conforming to the query may exist elsewhere.

Irrespective of the reasons for repeating the query, it is emphasized that one form of the invention directs the query contained within the URL to multiple databases. For example, it may be known to the receiving server that the drawee bank maintains multiple servers, containing multiple databases, or a single database distributed over the multiple servers. The receiving server directs the query to the multiple servers.

Additional Considerations

1. The query can be formatted in other ways. For example, in the query discussed above, a field is identified, and then the contents of the query for that field are specified, as in "Dr=40203," which identifies a drawer's account number of 40203.

In another approach, the field can be identified by position, and the identifiers can be eliminated. For example, by pre-arranged convention, the positions may be assigned the following order:

Drawee bank 20, Drawer 24, Payee 27, Amount 30, Date 33, and Number 39.

Thus, the query given above may be phrased as follows: 066-884; 40203; Grant Wilcox; 42.00; 03/03/99; ?.

The query/URL combination would then be

BANK_SERVER_3.COM/066-884; 40203; Grant Wilcox; 42.00; 03/03/99; ?.

If the submitter wanted digitized cancelled checks returned after the query is run, the query would be written as 066-884; 40203; Grant Wilcox; 42.00; 03/03/99; ?; Ret=Y.

One form of the invention displays an image of a check, as shown in FIG. 2. The invention allows the user to select one, or more, of the parts of the check, to be returned with the results of the query. When the invention locates the checks matching the query, the invention returns the bitmaps of the selected parts.

2. The query/URL combination contains a specific quantity, and type, of information, and no other. It contains the URL of a targeted server, which acts as the address of the targeted server.

It also contains a query, which specifies content of designated fields of cancelled checks. The query may identify fields by identifiers, such as "De," discussed above, or by position. However, in one form of the invention, the query/URL combination contains no other significant symbols.

From another point of view, the query part of the URU-query pair contains only information which is contained in the data fields of the target check, or checks. These fields are identified in connection with FIG. 2, and include, for example, (1) the identity of the drawee bank, either by name or code number, (2) the account number of the check writer, and so on.

Significantly, the query does not contain the location of the server containing the database to which the query is directed, nor the name of a file, directory, or storage device which contains that database.

In contrast, in another approach, it is possible to transmit a query to a web site, by addressing a data packet with the URL of the web site, and to position the query near the URL.

However, in such an approach, much other material is also placed near the URL, and, in fact, between the URL and the query. This other material may identify various computers and computer files, for various purposes.

Under the invention, the other material is not present.

Explaining the preceding in a different way, it may appear that, in the prior art, approaches similar to the invention are found in the use of "search engines." However, search engines maintain indices, on their local computers. For example, if one ran the query "United States Patent Office," the search engine would look up that term in its local index, identify the server or servers listed, and direct the query to those servers.

In contrast, the invention utilizes the semantics of the query to locate the server of interest. No index is involved. For example, the drawee bank may be stated in the query, thereby identifying a database. If the query sought all checks made payable to "Pacific Gas and Electric," then the query would be directed to multiple databases, and thus multiple servers.

3. Under one form of the invention, the data transmitted to a server contains (1) the server's URL and (2) a minimal set of parameters required to define the target(s) of the query, but nothing else.

4. A selected server uses the URL to decide which other servers to make requests to on the searcher's behalf. For example, the routing transit number (which identifies the drawee bank) will indicate which server holds the check. The server then routes the query to that server. It uses heuristics to dynamically locate checks by their semantics. This is distinct from a search engine, which uses an index to perform the routing, as explained above.

5. FIG. 3 shows a person M generating a query at a server. That query is directed along route A1 to a server SS, which bears the URL which is associated with the query/URL combination. Significantly, no checks are stored at server SS, and server SS contains no database containing selected data from cancelled checks. Server SS identifies a server containing a database relevant to the query, and routes the query to the server handling that database.

Thus, as explained herein, the query can be routed to a specific server storing a database, or to a server storing no database, but having the ability to identify a server handling a database relevant to the query.

In general terms, the query is transmitted to a system of servers, and the system determines, based on the query, which of the databases handled by them to search.

Numerous substitutions and modifications can be undertaken without departing from the true spirit and scope of the invention. What is desired to be secured by Letters Patent is the invention as defined in the following claims.

What is claimed is:

1. A method, comprising:
   a) storing data indicative of the contents of a plurality of cancelled bank checks;
   b) receiving a URL which includes a search string; and
   c) performing a search of the data, using the search string, wherein the search is forwarded to multiple databases in multiple servers, based on semantics of the search string.

2. Method according to claim 1, wherein the URL contains information which (i) identifies a server, (ii) sets forth the search string, and no other information.

3. Method according to claim 2, wherein the URL contains no information which directly identifies a file contained within a server.

4. Method according to claim 1, and further comprising:
   d) identifying any checks conforming to the search string.

5. Method according to claim 4, and further comprising:
   e) retrieving from storage the checks identified, or copies thereof.

6. Method according to claim 1, wherein the search string contains information which identifies a database to which the search string is directed.

7. Method according to claim 1, wherein the query contains information which identifies a database to which the search string is directed.

8. A method, comprising:
   a) storing cancelled bank checks, or copies of cancelled bank checks, or both;
   b) maintaining a plurality of records, each record
      i) corresponding to a stored cancelled bank check, and
      ii) containing selected data from the check;
   c) receiving a URL containing a search query; and
   d) searching the records, using the search query, wherein the searching is forwarded to multiple databases in multiple servers, based on semantics of the search query.

9. Method according to claim 8, and further comprising
   e) maintaining additional groups of records, each group on a respective server, each record
      i) corresponding to a stored cancelled bank check, and
      ii) containing selected data from the check.

10. Method according to claim 8, and further comprising:
    e) identifying cancelled checks while searching.

11. Method according to claim 10, and further comprising:
    f) retrieving from storage the checks identified, or copies thereof.

12. Method according to claim 8, wherein the URL contains information which (i) identifies a server, (ii) sets forth the query, and no other information.

13. Method according to claim 12, wherein the URL contains no information which directly identifies a file contained within a server.

14. Method according to claim 8, wherein the URL contains an address of a targetted server, a query, and no other information.

15. A system, comprising:
    a) a plurality of cancelled checks, stored at different locations;
    b) a group of databases, each containing information about a respective subset of the cancelled checks; and
    c) means for accepting a search query containing a single phrase, and searching all databases for cancelled checks which match the query, wherein the search query is part of a URL and the searching is forwarded to multiple databases in multiple servers, based on semantics of the search query.

* * * * *

UNITED STATES PATENT AND TRADEMARK OFFICE
CERTIFICATE OF CORRECTION

PATENT NO. : 6,665,660 B1
DATED : December 16, 2003
INVENTOR(S) : M. Cordner and R. Hildred It is certified that error appears in the above-identified patent and that said Letters Patent is hereby corrected as shown below:

Title page,
Item [74], *Attorney, Agent, or Firm*, "Gregory A. Welta" should be -- Gregory A. Welte --.

Column 8,
Line 7, delete "c)" and insert -- e) --.

Signed and Sealed this

Fourth Day of May, 2004

JON W. DUDAS
*Acting Director of the United States Patent and Trademark Office*